US009066250B2

(12) United States Patent
Kazmi et al.

(10) Patent No.: US 9,066,250 B2
(45) Date of Patent: Jun. 23, 2015

(54) METHOD AND NETWORK NODE IN A COMMUNICATIONS SYSTEM

(75) Inventors: Muhammad Kazmi, Bromma (SE); Ali Behravan, Stockholm (SE); Gabor Fodor, Hässelby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 167 days.

(21) Appl. No.: 13/817,909

(22) PCT Filed: Aug. 26, 2010

(86) PCT No.: PCT/SE2010/050917
§ 371 (c)(1),
(2), (4) Date: Feb. 20, 2013

(87) PCT Pub. No.: WO2012/026857
PCT Pub. Date: Mar. 1, 2012

(65) Prior Publication Data
US 2013/0155991 A1    Jun. 20, 2013

(51) Int. Cl.
*H04W 80/04* (2009.01)
*H04W 88/06* (2009.01)
*H04W 28/04* (2009.01)
*H04W 72/04* (2009.01)
*H04W 24/02* (2009.01)
*H04W 24/10* (2009.01)
*H04W 28/08* (2009.01)
*H04W 88/10* (2009.01)
*H04B 17/382* (2015.01)

(52) U.S. Cl.
CPC .............. *H04W 24/02* (2013.01); *H04W 24/10* (2013.01); *H04W 28/04* (2013.01); *H04W 28/08* (2013.01); *H04W 72/0453* (2013.01); *H04W 88/10* (2013.01); *H04B 17/382* (2015.01)

(58) Field of Classification Search
CPC ..... H04W 80/04; H04W 88/06; H04W 28/04; H04W 72/04
USPC .................................................. 370/328, 329
See application file for complete search history.

(56) References Cited

U.S. PATENT DOCUMENTS

2007/0232312 A1    10/2007 Gallagher et al.
2008/0076425 A1    3/2008 Khetawat et al.
(Continued)

FOREIGN PATENT DOCUMENTS

WO    2005060292 A1    6/2005
WO    2005099185 A1    10/2005

*Primary Examiner* — Ronald B Abelson
(74) *Attorney, Agent, or Firm* — Murphy, Bilak & Homiller, PLLC

(57) ABSTRACT

The present disclosure relates to a method and a network node 100 in a wireless communications network 1. In particular, it relates to selecting a frequency band for operation for user equipment 9 in the wireless communications network 1. The frequency band to be selected is either a licensed frequency band or an unlicensed frequency band. The network node 100 is a macro base station 5, or a home base station (7, 700), and is adapted to communicate with user equipments 9 in the wireless communications network 1 which comprises both the macro base station 5 and the home base station (7, 700). The home base station (7, 700) is adapted to support operation in both the licensed frequency band and the unlicensed frequency band. The method comprises obtaining radio condition measurements performed on the licensed frequency band and/or on the unlicensed frequency band; selecting the frequency band, based on the obtained radio condition measurements; and updating the home base station of the selected frequency band to be used for communication with one or more of the user equipments.

23 Claims, 7 Drawing Sheets

(56) References Cited

U.S. PATENT DOCUMENTS

| | | | |
|---|---|---|---|
| 2008/0298450 A1* | 12/2008 | Zhang et al. | 375/227 |
| 2009/0017824 A1 | 1/2009 | Lee et al. | |
| 2010/0046440 A1 | 2/2010 | Singh | |
| 2010/0208681 A1 | 8/2010 | Elmaleh | |
| 2011/0047012 A1* | 2/2011 | Sherman | 705/14.1 |
| 2011/0130138 A1* | 6/2011 | Lee et al. | 455/435.1 |

* cited by examiner

METHOD AND NETWORK NODE IN A COMMUNICATIONS SYSTEM

TECHNICAL FIELD

The present disclosure relates to a method and a network node in a wireless communications network. In particular, it relates to selecting a frequency band for user equipment operation in the wireless communications network.

BACKGROUND

Unlicensed bands (spectrum bands, frequency bands or operating frequency bands) have for long time now been used as an alternative to licensed bands in order to compensate for spectrum scarcity and high licensing costs of the spectrum for mobile communications. Spectrum scarcity refers to the fact that there is lack of spectrum resources for cellular communication systems relative to traffic demand imposed by popular cellular services such as voice, Internet access and other high bit rate data services. The licensed bands for mobile communication especially in the frequency ranges between about 700 MHz to 2 GHz is scarce since the propagation characteristics in this frequency range are favourable for various types of wireless communication notably wireless digital TV, satellite communication, wireless military communication, wireless public safety networks, etc. Furthermore the licensed bands can be used only by an owner of the spectrum. This means that the licensed bands cannot be used by multiple networks at a same location or area. The licensed bands may operate in an open or wide area (e.g. macro network) and therefore also need to meet tight regulatory radio requirements to ensure protection to other licensed carrier frequencies in the same or in other bands, which in turn may also operate in a wide area.

Examples of unlicensed bands are for example the industrial, scientific and medical (ISM) radio transmission bands. Other examples of unlicensed bands are the short range, also denoted local, communication technologies, such as: Bluetooth operating in the 2450 MHz band, HIPERLAN standardized for the 5800 MHz band, and the IEEE 802.11 family widely deployed in the 2450 MHz and 5800 MHz bands.

While these mentioned unlicensed bands and other frequency bands are free to use, certain rules and regulations concerning maximum output power, power density and so called spurious emissions (signal outside a transmitter's assigned channel) still must be followed.

Wireless communications networks normally operate in licensed bands within a certain geographical region. Being able of operating wireless communications networks in unlicensed bands is becoming more and more attractive. Operation in unlicensed bands has for example advantages of increased bandwidth for transmission of user data, and reduced interference in licensed bands due to steering part of data traffic to the unlicensed bands. However, since many wireless communication devices i.e. user equipments, portable computers, Personal Digital Assistants (PDAs) etc. may share a same unlicensed band, interference management is therefore crucial for obtaining acceptable performance while complying with regulatory constraints. Examples of regulatory constrains are maximum output power level, Specific Absorption Rate (SAR) for handheld devices, out of band emission level, spurious emission, unwanted emission level etc. For example, the 3GPP technical report TR 34.925 specifies levels of so called SAR-requirements that make 3GPP devices compliant with regional regulatory requirements. Likewise, the 3GPP technical specification TS 36.101 Section 6.6.2.2 specifies spectrum emission masks that impose limits on 3GPP compliant UE transmit power levels in specific deployment scenarios.

Two examples of well known wireless communications networks are the Wideband Code Division Multiple Access (WCDMA) and the evolved UMTS Terrestrial Radio Access Network (E-UTRAN) (both Frequency Division Duplex (FDD) and Time Division Duplex (TDD)).

Operation in both licensed and unlicensed frequency bands encompasses transmission and reception of information. Hence, operation in frequency bands refers to both transmission and reception of signals. The frequency band is therefore also termed as an operating band or operating frequency band. However, the transmission and reception in frequency bands may take place in a same or in different frequency bands as explained further. In Frequency Division Duplex (FDD) frequency bands (e.g. used in UTRAN FDD and E-UTRAN FDD), uplink and downlink transmissions normally take place on different carrier frequency channels. Therefore, in FDD frequency bands both uplink and downlink transmission can occur simultaneously in time. On the other hand, in Time Division Duplex (TDD) frequency bands (e.g. used in UTRAN TDD and E-UTRAN TDD) uplink and downlink transmissions normally occur on a same carrier frequency channel but in different time slots or sub-frames. A Half Duplex FDD (HD-FDD) which normally may be used in GSM can be regarded as a hybrid scheme where uplink and downlink transmissions are transmitted on different carrier frequencies and which also may be transmitted on different time slots or sub-frames. This means uplink and downlink transmission do not occur simultaneously. Both licensed and unlicensed bands can be FDD, TDD or half duplex FDD.

Smaller communications networks in for example hotspot areas, offices and homes are being deployed in order to be able to increase efficiency and coverage of wireless services that are to be provided to end user devices, such as user equipments. Examples of such smaller communications networks are 3GPP home NodeBs (HNBs) and IEEE femto base stations. Other terms used for similar smaller communications networks are: home base stations, local eNodeBs or home eNodeBs. In principle, the terms femto base stations, home NodeBs, home base station, local eNodeBs or home eNodeBs, all refer to similar types of base stations. An area or location that is served by the home base station may be referred to as a femto cell or home cell. One main difference compared to other classes of base stations, such as macro base stations, is that the home base stations are normally owned by private subscribers (end users), who have the liberty to install the home base station at any location. This makes it possible for the home base stations to be deployed at home or at public/private premises such as shopping malls, office buildings, restaurants etc. Therefore, strict network planning is not possible in case of home base stations deployment compared to macro base stations deployment which are deployed according to some well defined principles.

In general, a home base station operating in WCDMA or in E-UTRAN (FDD, TDD) has a maximum output power (Pf, max, antenna) limited to 20 dBm for non Multiple Input Multiple Output (MIMO) case, and for MIMO, 17 dBm per antenna port in case of two transmit antennas or 14 dBm per antenna port in case of four transmit antennas. This may be generalized according to the equation:

$$Pf, max, antenna = 20\ dBm - 10*\log 10(N)' \quad (1)$$

where N represents a number of transmit antenna ports at the home base station. The maximum output power comprises the power of all downlink transmitted channels including common channels such as common pilot or reference signals, synchronization signals, control channels such as scheduling channels and data channels such as shared data channels etc.

A known major problem with base stations operating in unlicensed frequency bands is interference between different devices that share a frequency band i.e. same bandwidth. It is an important issue to recognize that interference sources in the unlicensed frequency bands are different from interference sources in licensed frequency bands. This is because devices operating in unlicensed frequency bands are typically non cooperative but also because their operations are typically unpredictable i.e. out of control for any deployment or planning procedures. Being non cooperative means that classical Inter-Cell Interference Coordination (ICIC) techniques used in order to reduce inter-cell interference, especially in cell edge regions, which are traditionally used for base stations operating in the licensed frequency bands are not applicable or sufficient for base stations operating in unlicensed frequency bands. Therefore, the interference in the unlicensed frequency bands cannot be made "transparent" to the user equipment i.e. applications in unlicensed frequency bands may, and likely would, perform differently as compared to when running over licensed frequency bands.

Access control mechanisms for home base stations (HNBs, femto RBs) decide if a given user equipment can or cannot connect to that home base station. Selection of an access control mechanism may have a large impact on performance of the overall wireless communications network, mainly due to a role of the access control mechanism in definition of interference. Different known approaches have been proposed for access control:

Closed access: Only a subset of user equipment, defined by the owner of the home base station may connect to the home base station. This is a model of a so-called Closed Subscriber Group (CSG) definition defined by the 3rd Generation Partnership Project (3GPP);

Open access: All User Equipments (UE) with a certain subscription have the right to make use of the home base station;

Hybrid access: A limited amount of the home base station resources are available to all user equipment, while the remaining resources operate in a CSG fashion.

There are however several issues that need to be addressed in order to be able to perform dual operation of a home base station i.e. in both licensed and unlicensed frequency bands. The home base station needs to decide which frequency band it should operate in and which access control mechanisms it should employ. This is however problematic, because of the unpredictable interference and its impact on experienced Quality of Service (QoS) on user equipments in the unlicensed frequency bands. On the other hand, operating a home base station in unlicensed frequency bands may reduce the interference caused to the macro base station, i.e. in the macro cell.

SUMMARY

An object of exemplary embodiments is therefore to provide a possibility for performance improvement due to improved frequency band selection, and more in particular, the selection of a frequency band selected from a set of licensed frequency bands and a set of unlicensed frequency bands in a wireless communications network comprising both macro base stations and home base stations.

According to a first embodiment there is provided a method in a network node for selecting a frequency band, the frequency band being either a licensed frequency band or an unlicensed frequency band. The network node is a macro base station, or a home base station, and being adapted to communicate with user equipments in a wireless communications network. The wireless communications network comprises both a macro base station and a home base station which is being adapted to support operation in both the licensed frequency band and the unlicensed frequency band. The method comprises obtaining radio condition measurements performed on the licensed frequency band and/or on the unlicensed frequency band; selecting the frequency band, based on the obtained radio condition measurements; and updating the home base station of the selected frequency band to be used for communication with one or more of the user equipments.

According to a second embodiment there is provided a network node for selecting a frequency band, the frequency band being either a licensed frequency band or an unlicensed frequency band. The network node is being adapted to communicate with user equipments in a wireless communications network comprising both a macro base station and a home base station. The home base station is being adapted to support operation in both the licensed frequency band and the unlicensed frequency band. The network node comprises a transceiver circuit that is adapted to obtain radio condition measurements performed on the licensed frequency band and/or on the unlicensed frequency band. The network node further comprises a selector circuit that is adapted to select the frequency band, based on the obtained radio condition measurements and an processor circuit that is adapted to update the home base station of the selected frequency band. The home base station then will use the selected frequency band for communication with one or more of the user equipments.

An advantage achieved by at least one of the above mentioned embodiments is reduced interference in the wireless communications network.

Another advantage also achieved by at least one of the above mentioned embodiments is the possibility of performing load balancing by the network nodes in the wireless communications network.

The above mentioned advantages are achieved due to efficient selection between licensed and unlicensed frequency bands, i.e. based on radio condition measurements.

Other objectives, advantages and novel features of aspects of the present disclosure will become apparent from the following detailed description of embodiments and aspects.

BRIEF DESCRIPTION OF THE DRAWINGS

The embodiments are described in more detail with reference to attached drawings illustrating exemplary embodiments and in which.

DETAILED DESCRIPTION

Presently in UTRAN and E-UTRAN the terms home NodeB or home eNodeB or home base station are used more commonly. The latter is more generic as it covers any type of home base station. The term home base station and home Node B are interchangeably used in the rest of the disclosure. These terms also cover femto base station, home eNode B or similar base station type.

Figure 1:
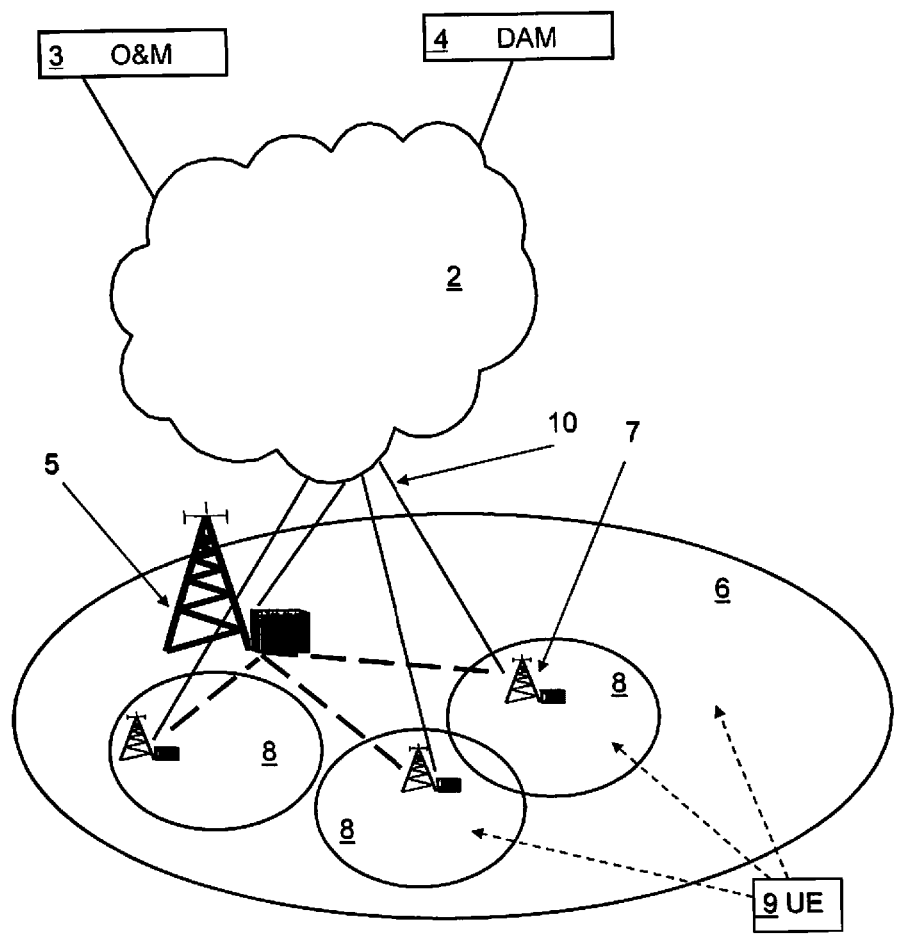
FIG. 1 is a schematic overview illustrating an embodiment of a wireless communications network.

FIG. 1, which is a schematic overview, illustrates an example embodiment of a wireless communications network 1. The wireless communications network 1 comprises a Mobile Core Network 2 (MCN) connecting one or more macro Base Stations 5 (macro BSs) and one or more home base stations 7 (home BSs) with other core network nodes and systems e.g. internet nodes (not shown in figure); an Operation and Maintenance 3 (O&M) subsystem; or a Home NodeB Database Manager 4 (DAM) etc. The DAM 4 is normally connected to the macro BS 5 via a macro BS/DAM interface and to the home BS 7 via a home BS/DAM interface. Normally the MCN 2 uses an interface 10, called the S1 interface, for communication with the macro BS 5 or the home BS 7. User Equipments 9 (UEs) in the wireless communications network 1 may be served by a home BS 7 when they are within a home BS cell 8 (femto cell), or by the macro BS 5 when they are in a macro cell 6. The macro BS cell 6 may cover one or more home BS cells 8, and the UEs 9 may be located in any of the macro or home BS cells. Each home BS 7 is normally in connection with the macro BS 5 via a radio link, not shown in figure, and via a backhaul link, showed by dashed lines in FIG. 1. Note that only one macro BS 5 is shown in this illustration for simplicity although several overlapping macro BSs may exist with overlapping home BS cells 8. In a hierarchical wireless communications network 1 the backhaul links of the wireless communications network comprises intermediate links between the MCN 2, normally via the macro BS 5, and the home BS:s 7 at the "edge" of the entire hierarchical network, i.e. wired connections.

Figure 2:
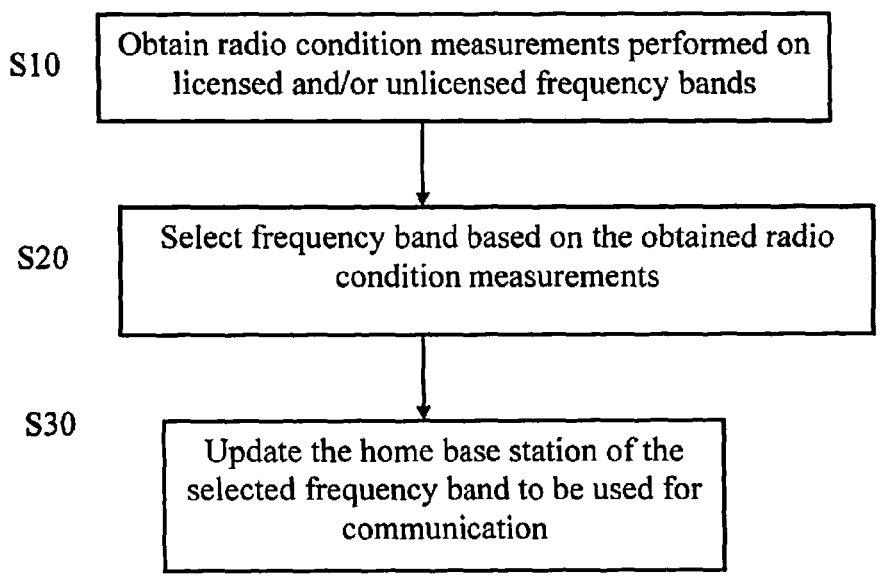
FIG. 2 is a flowchart depicting an example embodiment of a method in a network node.

Based on the schematic overview described above and according to an example of an embodiment there is provided a method for selecting a frequency band that is to be used for operation, and wherein the method is to be implemented by a network node 100 of the wireless communications network 1, as in FIG. 2. The frequency band to be selected for operation is either a licensed frequency band or an unlicensed frequency band.

Note, that the above mentioned embodiment is not limited to only transmission in only one frequency band but that simultaneous operation in multiple, licensed and/or unlicensed, bands still is possible and will be described later on in this disclosure.

Continuing with the description of FIG. 2, the network node 100 is either the macro BS 5 or the home BS 7, which is adapted to support operation in both the licensed frequency band and the unlicensed frequency band, and wherein the network node 100 is adapted to serve one or more UEs 9 located within a cell of the wireless communications network 1. The method comprises: obtaining S10 radio condition measurements performed on the licensed frequency band and/or on the unlicensed frequency band; selecting S20 the frequency band, based on the obtained radio condition measurements; and updating S30 the home base station 7 of the selected frequency band to be used for communication with one or more of the user equipments 9. The radio condition measurements obtained are one or more of the following: total cell load; experienced interference level for one or more frequency bands; signal strength; and signal quality. The method thus provides a possibility for dynamic and adaptive selection, or switching, between the licensed and unlicensed frequency bands that effectively provides a means to handle "demand and supply" for licensed (and interference managed) spectrum resources without the need of spectrum sensing or cognitive radio techniques.

Figure 3:
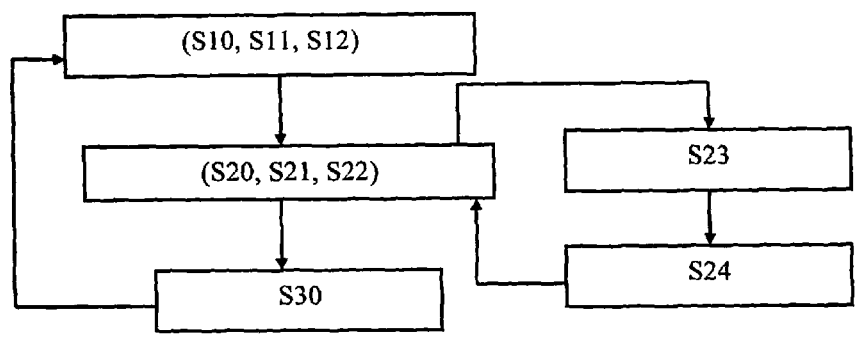
FIG. 3 is a flowchart depicting further embodiments of the method in a network node.

According to aspects of the above mentioned method embodiment, the selection (S20, S21, S22) may further be based on combined metric which includes radio condition measurements S10, user equipment (UE) measurements S11 and/or user equipment (UE) preferences S12, as depicted in FIG. 3. The UE measurements may be one or more of the following: Channel Quality Indicator (CQI) reportings indicating suitable data rate; Hybrid Automatic Retransmission re-Quest (ARQ); and Block Error Rate (BLER) performance. The user equipment preferences may be one or more of the following: closed subscriber group belongings; session prioritizations, and indications of preferred frequency bands.

As an example to the above, a majority rule based on user preference for selecting/switching to a licensed frequency band may be applied by the network node, i.e. Macro BS 5 or Home BS 7, only if the radio condition measurements reveal that the interference level is below a predefined threshold. Additionally, selection may further be based on Global Navigation Satellite System (GNSS) quality measurements.

Alternatively, user equipments belonging to a specific Closed Subscriber Group (CSG) are always granted licensed spectrum resources i.e. UEs with high session prioritizations. Typically, such CSG membership is associated with higher charges or other defined conditions. Thus, UEs that are configured to receive an interference managed service, i.e. free from e.g. ISM band disturbances, are preferably served in licensed frequency bands to a higher cost, whereas UEs configured for use of a low cost unlicensed frequency bands are served in unlicensed frequency bands. The network node may adaptively take into account radio condition in the licensed frequency bands of the macro cell and effectively balancing load such that interference caused to macro BSs are minimized. As an example, the re-selection between licensed frequency bands and unlicensed frequency bands may be performed when the interference level in a macro cell of a wireless communications network operating in a certain frequency band exceeds a certain threshold and/or if there are sufficiently many UEs, CSG members, in the macro cell who are willing to be allocated resources of the unlicensed frequency bands. Selecting to go back to a licensed frequency band from an unlicensed frequency band is done if the interference level in the licensed frequency band is within acceptable limit, i.e. compared to a predefined or signalled threshold.

Additionally frequency band selection rules, e.g. majority vote or maximizing revenue or combined rule, may be predefined. Predefined configurations may be applied for frequency band selection/switching at a time given. Similarly the corresponding thresholds to be compared with at a given time may be signalled to the network node e.g. from a DAM or O&M network node, or may also be pre-defined e.g. default values. The threshold may further be obtainable for the network node via a backhaul connection. Note also that the radio condition measurements, the UE measurements, and/or the UE preferences may be obtained from a backhaul network and/or via the home BS 7.

In yet other aspects of the above mentioned method described in relation to FIG. 2, the method may further comprise: determining S23 available unlicensed frequency bands among the unlicensed frequency bands; and, verifying S24 that the home node base station is capable of operating in the determined available unlicensed frequency bands. The determining and verifying may be done as part of the selection (S10, S11, S12) as illustrated by FIG. 3.

Figure 7:
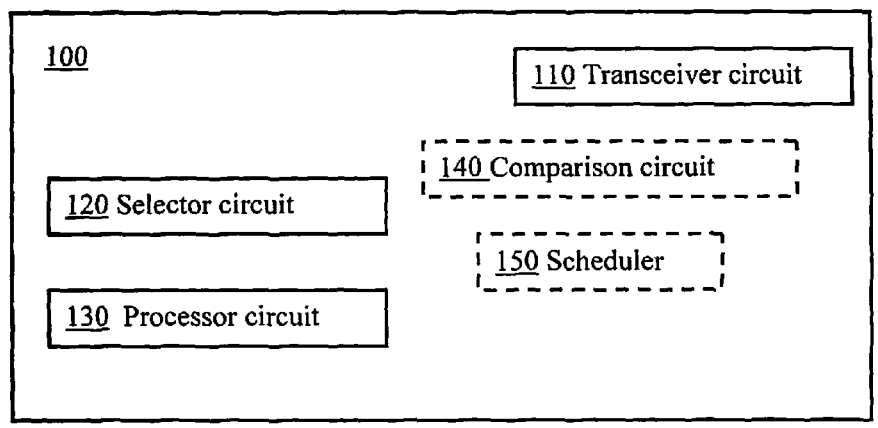
FIG. 7 schematic block diagram illustrating an example embodiment of a network node.

FIG. 7 is a schematic block diagram illustrating an example of embodiment of a network node for implementation of the above discussed methods and their aspects. The network node 100 is provided for selecting a frequency band being either a licensed frequency band or an unlicensed frequency band. The network node 100 is adapted to communicate with user equipments 9 in a wireless communications network 1 comprising both a macro BS 5 and a home BS 7 being adapted to support operation in both the licensed frequency band and the unlicensed frequency band. The network node 100 comprises a transceiver circuit 110 that is adapted to obtain radio condition measurements performed on the licensed frequency band and/or on the unlicensed frequency band. The network node 100 further comprises a selector circuit 120 that is adapted to select the frequency band, based on the obtained radio condition measurements and a processor circuit 130 adapted to update the home BS 7 of the selected frequency band. The selected frequency is selected for used for communication with one or more of the UEs 9. The network node 100 may further comprise a comparison circuit 140 adapted to compare the obtained radio condition measurements with one or more threshold values that are predefined or obtainable via a backhaul connection, and a scheduler 150 that is to be used for scheduling resources blocks. The comparison circuit 140 and the scheduler may exist as separate parts in the network node 100, or co-located with together with other circuits within the network node 100 e.g. the selector circuit 120.

The above mentioned network node 100 and its aspects may further be realised in two different ways, i.e. in a network node 100 being the macro BS 5 or in a network node 100 being the home BS 7.

In the case wherein the network node 100 being the home BS 7, the aspects mentioned above may further be implemented in different ways such as autonomous selection or network node controlled selection. By autonomous selection it is here meant that the method, mentioned in relation to FIG. 2, is implemented in the home BS 7, and that the method steps are to be performed by the home BS 7 itself.

Home BS autonomous selection, and switching, between licensed and unlicensed frequency bands for operation comprises the home BS 7, being capable of operating in both licensed and unlicensed frequency bands, obtaining/performing the radio condition measurements, selecting and updating by itself. The home BS 7 may further obtain user equipment measurements e.g. in terms of measured signal strength and/or signal quality in the supported licensed and unlicensed frequency bands, by itself. In addition the Home BS 7 as mentioned earlier also may use additional information in terms of user preferences, as a basis for the selection.

As an example, the Home BS 7 may use the obtained measured signal strength/quality together with measured interference levels as a first input to decide whether to select another frequency band or to continue operating in a current frequency band, i.e. based on comparison towards predefined thresholds. The final decision may further be influenced by the user equipment preferences. When the Home BS 7 for example operates in the licensed frequency band, it regularly obtains, or requests, radio condition measurements and user equipment measurements performed on other channels and/or on adjacent carriers and/or on other carriers within its operating frequency band. If the measurements are above a predefined threshold (e.g. home BS is determined to be close to a macro BS), the home BS stops operation in licensed frequency bands and selects an unlicensed frequency band to operate in to avoid interfering with the macro BS 5. Otherwise, the Home BS 7 continues to operate in the licensed frequency band.

Figure 5:
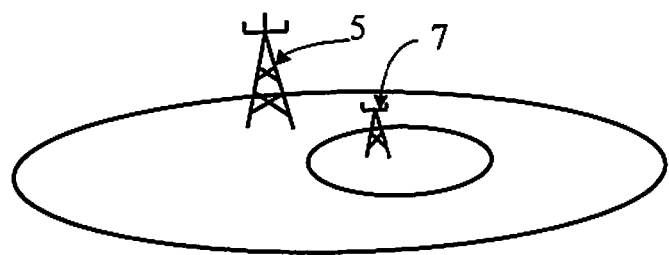
FIG. 5 is a schematic overview illustrating a case example wherein the Home BS 7 is located close to the macro BS 5.

FIG. 5 is a schematic overview illustrating a case example where the Home BS 7 operates in a licensed frequency band and is located close to the macro BS 5 and in which case the home BS is likely to decide by itself to select to operate in an unlicensed frequency band.

Figure 6:
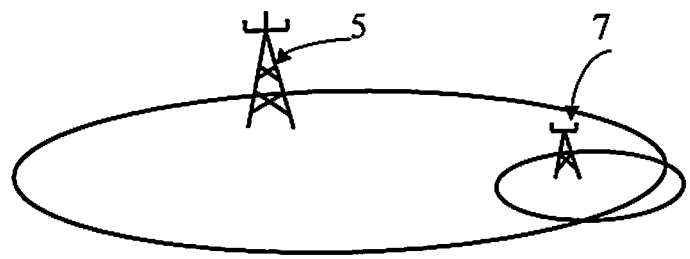
FIG. 6 is a schematic overview illustrating a case example wherein the Home BS 7 is located further away from the macro BS 5.

FIG. 6 is a schematic overview illustrating a case example where the Home BS 7 is located far away, or far enough away, from the macro BS 5. The home BS 5 in this case, e.g. operating in an unlicensed frequency band, may decide to select to operate in either the unlicensed frequency band or in a licensed frequency band, e.g. due to measured weak signal quality.

Additionally to the above, when a Home BS 7 selects an unlicensed frequency band autonomously instead of an operating licensed frequency band, the home BS 7 informs the macro BS 5 about the unlicensed frequency band it is now using. This is done so that the macro BS 5 may broadcast this information, in the macro cell 6 or to other macro BSs and home BSs 7. Broadcasting the information about operating licensed and unlicensed frequency bands will allow other home BSs 7 in the macro cell 6 to avoid using those operating frequency bands, or minimize the usage of them.

Autonomous selection, or switching, between licensed and unlicensed frequency bands may, as mentioned earlier, be based on metrics other than signal strength, signal quality or received interference. For instance, reported UE measurements such as downlink signal strength or signal quality may be used. Similarly, the UE may also use measurements such as global navigational satellite system (GNSS) received quality to determine whether the Home BS 7 is exposed to a traditional macro network or not, by aid of a GNSS receiver e.g. GPS receiver. For example if GNSS received quality is very low then Home BS 7 is assumed to be shielded from the macro BS 5. In that case the Home BS 7 may switch to a licensed frequency band. The Home BS 7 can further combine the traditional radio measurements such as signal quality or interference as well as the GNSS quality as a double check to determine whether to switch to an unlicensed band or continue the operation in a licensed band.

The threshold values to be used in the case examples of FIG. 5 and FIG. 6 may be defined such that the Home BS 7 may advantageously operate in several frequency bands merely based on radio condition measurements performed in those frequency bands. A UE 9 connecting to the Home BS 7, may optionally signal to the home BS 7 which frequency band, licensed or unlicensed frequency band or both, the UE would like to operate in. A UE 9 willing to be served in an unlicensed frequency band may for example get reduced charging rates. If there are several UEs 9 with diverse UE preferences connected to a home BS 7, the home BS 7, or any other network node managing or controlling the home BS 7, may use these UE preferences as additional input to the frequency band selection decision. The home BS 7 may for example employ different frequency band selection strategies, including a "majority vote" or, in the case of frequency band dependent charging, maximizing revenue. The "majority vote" selection may be expressed in terms of a simply majority, i.e. >50%, or in terms of "X"%, wherein X>50%, of the UEs 9 preferring certain type of frequency band i.e. operating in a licensed or unlicensed frequency band.

Alternatively, UEs 9 belonging to a specific CSG are always granted licensed frequency bands i.e. licensed spectrum resources. Typically, such CSG membership is associated with higher charges or other predefined conditions i.e. better quality of service (e.g. higher UE data rate), better grade of service (e.g. low call dropping) etc.

The frequency band selection rules i.e. majority vote or maximizing revenue or combined rule, may be predefined. The wireless communications network 1 may also configure with the home BS 7 a particular rule to be applied for frequency band selection or reselection/switching at a time given. Similarly, corresponding thresholds may be signalled to the home BS 7 from another network node or the thresholds may also be pre-defined e.g. default values.

Figure 4:
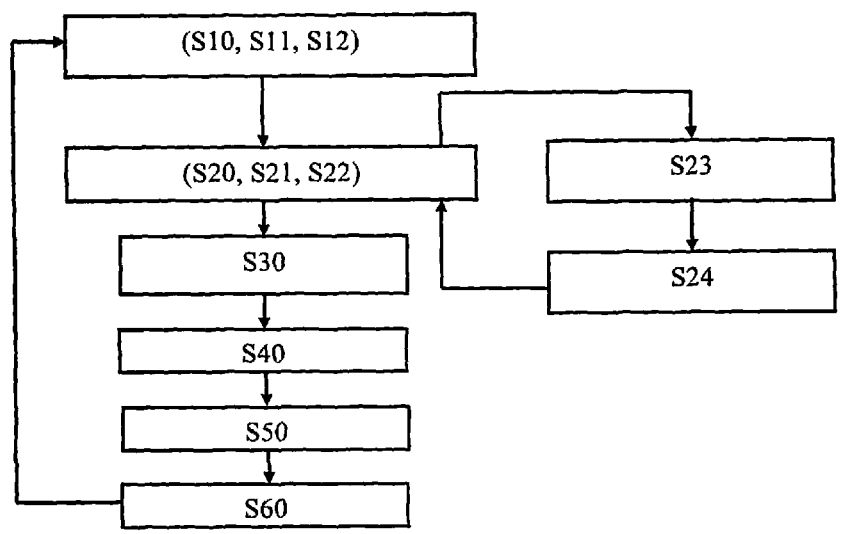
FIG. 4 is a flowchart depicting yet further embodiments of the method in a network node.

FIG. 4 is a flowchart depicting yet further embodiments of the method in a network node, following the case of the network node 100 being the home BS 7. According to FIG. 4 the network node 100 is being configured to perform the obtaining, the selecting and the updating by itself, and further: determining S40 if the updating results in that a new selected frequency band is different from a previously selected frequency band; transmitting S50 data and/or information on the new selected frequency band and on the previously selected frequency band simultaneously for a predefined time period; and switching S60 to the new selected frequency band when the predefined time period has passed. Updating may further comprise a step of updating the home BS 7 with an access control mechanism. The access control mechanism is normally to be determined by the macro BS 5.

Figure 8:
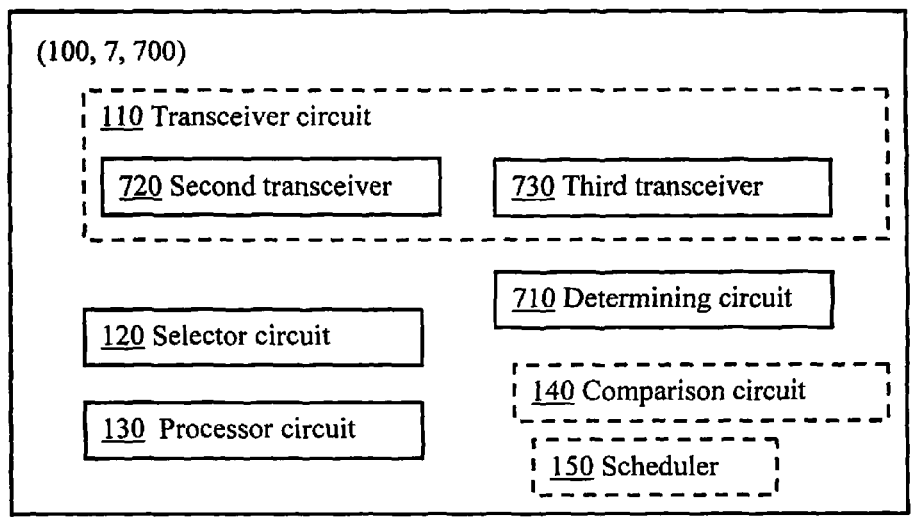
FIG. 8 is a schematic block diagram illustrating further embodiments of the network node.

FIG. 8 is a schematic block diagram illustrating an example of embodiment of a home BS 7 for implementation of the above discussed methods and their aspects. According to this implementation, the network node (100, 7, 700) being the home BS (7, 700) further comprises a determining circuit 710 adapted to determine if the updating results in that a new selected frequency band is different from a previously selected frequency band. This may be implemented as a matching procedure (not shown in any of figures). The network node (100, 7, 700) further comprises a second transceiver 720 adapted to transmit data and/or information on the new selected frequency band, and a third transceiver 730 adapted to transmit data and/or information on the previously selected frequency band, simultaneously, for a predefined time period. The network node (100, 7, 700) also comprises a switch circuit 740 adapted to switch to the new selected frequency band when the predefined time period has passed. The predefined time period may be preconfigured i.e. default values, or signalled to the home BS 7 from another network node e.g. macro BS 5 or O&M 3 or DAM 4.

In the case wherein the network node 100 is the macro BS 5, i.e. the other deployment of the method described in relation to FIG. 2 and its aspects, selection of a frequency band by a home BS 7 between licensed and unlicensed frequency bands is controlled and managed by the macro network, i.e. the macro BS 5. The macro BS 5 in this case will be responsible for requesting and/or obtaining radio condition measurements performed on licensed and/or unlicensed frequency bands e.g. in order to determine interference level on operating frequency bands. The macro BS 5 then selects a frequency band for operation and informs the home BS 7 of which frequency band the home BS is supposed to use for communication.

The above mentioned macro BS 5 may also comprise one or more of the following steps: obtaining/requesting UE measurements; obtaining/requesting UE preferences; verifying if the home BS supports operation on licensed and/or unlicensed frequency bands; determining available unlicensed frequency bands; and, configuring the home BS 7 to operate on unlicensed frequency band if interference on licensed frequency band exceeds a threshold value, or configuring the home BS 7 to operate on unlicensed or licensed frequency bands if interference on the licensed frequency band is below a threshold value. The obtained/requested radio condition measurements, UE specific measurements, and/or UE preferences are obtained/requested from the home BS 5 via a radio connection or via a backhaul link, or from a core network node e.g. O&M or DAM. The same applies for the thresholds values which may be obtained/requested from the home BS 5 via a radio connection or via a backhaul link, or from a core network node e.g. O&M or DAM.

The macro BS 5, being the network node 100, may update the home BS 7 by sending an update message to the home BS 7, wherein the update message comprises the selected frequency bands. Additionally, the update message may comprise one or more of the following information: interference level of the licensed bands; interference level of one or more of the unlicensed frequency bands; indications of other recommended frequency bands other than the selected frequency bands; and, indicators of priority level for each of the recommended frequency bands. The update message may be sent to the home BS 7 according to any one of the following principles: broadcasting the update message over a radio interface and requiring the home base station to listen; sending the update message to the home base station via a backhaul network; or, sending the update message to the home BS via a UE 9 i.e. relaying the message to the home BS 7 over the UE 9.

Considering now a scenario in which the macro BS 5 operates in a licensed frequency band. The macro BS 5 performs one or more radio condition measurements and/or uses UE measurements to monitor the interference situation in the macro cell 6. The measurements, which may be performed according to known in prior art procedures are in turn used for identifying the possible operation of home BSs 7 in licensed frequency bands. Examples of such measurements are:

Macro BS 5 measures the state of the art uplink received power, i.e. total received interference, in the operating licensed frequency band.

Macro BS 5 includes means, i.e. is equipped with a state of the art measuring unit (not shown in figures), to measure or determine received (downlink) signal from other base stations e.g. measures pilot or reference signal quality in both licensed and unlicensed band.
  1. Macro BS may distinguish between home BSs and macro BSs since the macro BS 5 knows a physical cell ID (PCI) of other macro BS:s.
  2. Each home BS 7 sends a home BS identifier e.g. home BS specific PCI within a reference signal transmitted by the home BS 7; macro BS after reading broadcast channel may uniquely identify whether a particular reference signal belongs to another macro BS or a home BS 7.

Macro BS 5 also receives downlink channel measurements performed by the UE 9, which is under the control of the macro BS 5.

Macro BS 5 monitors change in served cell performance e.g. by means of CQI quality or HARQ feedback monitoring.

The macro BS 5 suspects that a home BS 7 is operating on licensed bands and is contributing to substantial interference when one or more of the following conditions, which utilize one or more of the above mentioned measurements, are met:

1. If measured uplink interference (IUL) exceeds a certain predefined or signalled threshold then the macro BS 5 decides that the interference level is not alone contributed by macro UEs;
2. If home BSs 7 downlink signal quality, which normally is measured by the macro BS 5, exceeds a certain predefined or signalled threshold e.g. condition met for at least a number of home BSs; indicating there are strong home BSs 7 operating on licensed frequency band;
3. If UE reporting signal quality e.g. Reference Signal Received Quality (RSRQ), from at least some cells is usually low e.g. below a certain predefined or signalled threshold, indicating that UE is receiving very high interference.
4. If served macro cell 6 performances deteriorate unusually for a number of UEs 9 over a certain period of time e.g. number of NACK exceeds a certain predefined number, or channel state information such as CQI is substantially poor etc.

The macro BS 5 upon experiencing high interference level situation on the licensed frequency band may further verify whether the home BSs 7 are the major contributors i.e. strong home BS, to the experienced interference level on the licensed frequency band or not.

The macro BS 5 may verify if a home BS 7 is operating on a licensed or on an unlicensed frequency band by one or more of the following embodiments:

Obtaining/requesting of information of home BSs 7 via the backhaul links.

Obtaining/requesting of information of home BSs 7 via UEs 9 located in the macro cell 6: requesting UEs in the macro cell to report cell global identity (CGI) or physical cell identity (PCI) of suspected strongest home BSs. This is done when the macro BS 5 has an ambiguity regarding whether a base station is a home BS or another macro BS.

The above mentioned two embodiments which enable the macro BS 5 to verify home BS operation on licensed and unlicensed frequency bands, are elaborated further below.

When it comes to the first embodiment i.e. obtaining/requesting (acquisition) of information of home BSs via backhaul links, It is assumed that the macro BS 5 maintains a database of all home BSs, which are currently operating in at least the licensed frequency bands, and also possibly in the unlicensed frequency bands. In addition the home BSs 7 may also provide their location information to the macro BS 5. A home BS 7 may either itself acquire location information by any state of the art means or acquire approximate location information e.g. that of UEs served by the home BS 7. For instance the home BS 7 may request one or more UEs which have GNSS receiver, and are able to receive GNSS signals, to report their location. The database may be maintained in the macro BS 5 or in a network node, logical or physical, e.g. in the core network such as the O&M or DAM.

A following example to the above, the home BSs 7 may be configured or pre-configured by the macro BS 5 via backhaul signaling on backhaul links e.g. via a gateway, to register or report when the home BSs start or terminate their operation in licensed frequency bands. The macro BS 5 may also be adapted to configure the home BSs to register when the home BSs 7 operate in licensed frequency bands provided certain conditions pertaining to interference level or signal level are met e.g.: if home BS downlink transmit power is above a threshold; or, a number of UEs or their aggregated transmitted power of UEs, which are under home BS control, exceed their respective thresholds etc. The received registration information sent by the home BSs 7 is thus used by the macro BS 5 to dynamically update the database. The home BSs 7 may also be configured to perform the registration when they start operating in unlicensed frequency bands or when switching from licensed to unlicensed frequency bands or vice versa.

Following from above the macro BS 5, which suspects that substantial interference on a licensed frequency band e.g. licensed frequency band "B1", is contributed by the home BSs 7, may send requests to the network node including the database to report a status of home BSs on licensed frequency band "B1". The network node e.g. the DAM 4, reports an identifier of the home BSs 7 operating in licensed frequency band "B1" to the requesting macro BS 5. The DAM 4 may also use location information of the macro BS 5 and home BSs 7 to send the identifiers of the most relevant home BSs 7 which substantially contribute interference to the macro BS 5. The location information of the macro BS 5 (or macro BSs) and home BSs 7 enables the DAM 4 to determine the home BSs 7 located closest to the macro BS 5 (or to each macro BS when having several macro BSs). The closest home BSs 7 which also may operate in licensed frequency band B1 are thus considered to be the most relevant home BSs 7 in terms of interference on the licensed frequency band B1. For example the information about the home BSs 7 operating within a macro cell 6 on the licensed frequency band "B1" may only be reported to the macro BS 5. The macro BS 5 then compares the reported information, in this case by the DAM 4, with the radio condition measurements and UE measurements, which triggered the verification of home BSs operation in licensed frequency band mentioned earlier. If a match is found i.e. macro BS 5 and/or macro UE 9 measurements match with the reports from DAM 4, then it is verified that the home BSs 7 are strongly contributing to the interference level on the licensed frequency band "B1". As a consequence the macro BS 5 may send a flag to one or more of the home BSs 7 informing them to switch operation on to the unlicensed frequency bands.

Going on with a second embodiment wherein the macro BS 5 may verify if a home BS 7 is operating on a licensed or on an unlicensed frequency band by obtaining or requesting of information via UEs 9 in the macro cell 6. According to this second embodiment the verification of the presence of strong home BSs 7 is performed by the macro BS 5 by requesting the UEs 9 in the macro cell 9 i.e. UE under the control of macro BS 5, to report a Cell Global ID (CGI) of one or more of the suspected strongest home BSs in terms of their received signal quality. Hence the strongest home BS 7 is the one whose measured signal quality is the largest. The signal quality of a home BS 7 is typically measured by the UE on synchronization signal and/or on any type of reference signal. For example the macro BS 5 may send physical cell IDs of the expected home BSs 7 to one or more UEs 9, which in turn decodes the CGI of the cells corresponding to the Physical Cell Identifier (PCI) of the expected home BSs 7 by reading broadcast channels of these cells. The expected home BSs 7 may be determined by the macro BS 5 based on the UE measurement reports, which comprises of at least the PCI of the identified cells. The macro BS 5 may compare the reported PCI of cells with the list of PCI of the home BSs 7 and other macro BSs operating in the area. For example if the reported PCIs X match with those of the home BSs 7 or if they don't match with those of the macro BSs, then macro BS may expect these reported PCI belong to the home BSs. Alternatively, the macro BS 5 may simply request one or more UEs 9 to report the CGI of a number (K) of strongest cells in terms of the received signal quality on certain frequency bands. The UE normally identifies cells, sort them in the order of decreasing signal quality and report the K cells with the largest signal quality level. The macro BS 5 may also request one or more UEs 9 to report any other specific information of the cells, such as cell type identifier, which could enable the macro BS 5 to verify whether the cells are home BS cells 8 or not. The cell type identifier can be signaled by a BS e.g. home BS identifier is signaled by the home BS 7 in broadcast channel. The reported CGI of the cells or any other specific information e.g. cell type identifier, as mentioned above, may be used to verify whether the suspected cells are home BS cells 8 or not. The idea of requesting UE to report CGI of cells is considered to be known. The reported CGI in existing prior art is normally used by the macro BS 5 to decide whether to perform handover (HO) towards a certain target cell or not. For example the macro BS 5 may use the reported CGI to avoid doing the HO towards a restricted cell such as a CSG cell. However, according to these above mentioned two embodiments the CGI or other relevant information are used to generate a flag, which is to be used to configure the home BSs 7 to operate using an appropriate frequency band.

The macro BS 5 normally comprises means to select within its vicinity the available unlicensed frequency bands and also other possible licensed frequency bands, which have preferably low interference level. This means that the selection of a frequency band is based on the radio condition measurements performed over unlicensed bands, which are likely to be present in the vicinity of the macro BS 5. On the other hand the determination of the available frequency bands in particular the unlicensed frequency bands may also be based on static or semi-static principles. For example the macro BS 5 may obtain/acquire such information from a predefined database or from other network nodes e.g. the O&M 3, the DAM 4 or a Self-Optimizing/Organizing Network (SON). However it is more appropriate that the macro BS 5 is aware of the interference level situation in the candidate unlicensed frequency bands, which are eventually recommended for use by the home BSs.

Typically the macro BS 5 operates in licensed frequency band so in this embodiment the macro BS 5 would require a separate receiver, which is capable of determining the interference level on unlicensed frequency bands, if not that information is to be received from the home BSs 7. In an alternative embodiment whereby the macro BS may also itself operate in an unlicensed frequency band, the macro BS 5 may perform the radio condition measurements on unlicensed frequency bands while operating in an unlicensed frequency band. It should be noted that macro BS maximum output power limit is not specified. This means that it is possible to manufacture low power macro BSs e.g. for local or indoor areas. Hence a low power macro BS may in principle operate also in unlicensed frequency bands.

In another embodiment the macro BS 5 operating in unlicensed frequency bands, gathers information about the experienced interference level in that operating frequency band. It then periodically sends a summary report to nearby macro BSs so that the nearby macro BSs may create a list or a recommendation list of available unlicensed frequency bands and signal it to home BSs 7. The home BSs 7 may also autonomously determine an available unlicensed frequency band for operation. This is useful in case only a flag to switch to unlicensed frequency band is sent from the macro BS 5 to the home BS 7 but no recommended unlicensed frequency band is provided by the macro BS 5.

Another possible consequence of the received flag by the home BS7 from the macro BS 5 could be that the home BS 7 stays in licensed frequency band but reduces the output power if it has UEs with licensed frequency band preference. This may also be sent as recommendation from the macro BS 5. Upon receiving the flag the home BS may switch to licensed frequency band, operate in both licensed and unlicensed frequency bands, or reduce its output power.

In another embodiment the home BSs 7 broadcasts information on what unlicensed frequency bands they support. Further on, the home BSs 7 may be configured to either accept UEs outside of a specific CSG on selected frequency bands or to accept only specific CSG UEs on the selected bands.

In yet another embodiment any of the methods mentioned earlier, or their aspects, is provided for load balancing between licensed and unlicensed frequency bands. By utilizing the dual operation of HNBs in licensed and unlicensed bands, it is possible to perform load balancing between the two operating bands. Both home BS 7 autonomous selection/switching and macro BS 5 controlled selection/switching methods may be used to achieve load balancing between licensed and unlicensed frequency bands. According to this embodiment the home BS 7 broadcasts information on what unlicensed frequency bands it supports operation, and the home BS 7 may further select either to accept only specific CSG users in the licensed frequency bands, or accepts users outside of the specific CSG on these frequency bands, based on UE preferences. Then the home BS 7 determines, or gets information (flag), that only limited operation over licensed frequency band is allowed due to high interference level in the licensed frequency band. Determination to select/switch to a new frequency band is then performed either autonomously by the home BS 7 or requested by the macro BS 5. The home BS 7 may then operate in both licensed and unlicensed frequency band, simultaneously or switch between those. The home BS7 may also decide to allow a CSG to operate in licensed frequency band and if necessary with reduced output power or in partial bandwidth. The remaining users are then directed to operate in unlicensed frequency band. The home BS 7 may fully operate in the licensed frequency band when it determines that no restriction is required for operating in the licensed frequency band.

Both, home BS autonomous selection/switching and macro network, i.e. macro BS, controlled selection/switching would involve a transition phase while the home BS 7 operation is reselected/switched between the licensed and unlicensed frequency bands. When UEs 9, which are in idle and connected modes, are served by the home BS 7, which wants to switch from licensed to unlicensed frequency bands or vice versa, the home BS 7 signals these UEs 9 that there will be a transition phase, predefined time period, while switching between licensed and unlicensed frequency bands. Typically the transition phase, i.e. duration of predefined time period, may cause interruption in home BS 7 operation. In a further embodiment the home BS 7 may also operate simultaneously in both licensed and unlicensed frequency band during a limited predefined time period in order to provide a smooth transition when reselecting frequency bands. The home BS 7 may also perform partially smooth transition, by which it is meant that the home BS 7 operates in part of a bandwidth of an initial frequency band, e.g. licensed frequency band, while doing transition to the next frequency band, e.g. unlicensed frequency band. For example a selected part of the bandwidth in the initial frequency band may send limited data and control information until the UEs 9 attains synchronization with and acquires relevant system information of home BS 7 operating in unlicensed frequency band(s). This means that the UEs 7 synchronize to the home BS 7 without losing data or with minimal loss of data. This selected part of the bandwidth of the initial frequency band may comprise of resource blocks in a center of the cell bandwidth. In LTE systems all common control channels e.g. Physical Broadcast CHannel (PBCH), Primary Synchronization Sequences (PSS), Secondary Synchronization Sequences (SSS), Reference Signal (RS) etc., are sent in central 6 Resource Blocks (RBs) regardless of the bandwidth available/used in a cell. The common channels are necessary to retain communication between the home BS 7 and the UE 9. Hence in LTE systems the selected bandwidth of the initial frequency band in the home BS 7 during the transition phase should comprise of at least 6 home RBs. Hence according to this embodiment the UE 9 may be served by the part of the initial frequency band, i.e. by licensed frequency band, while the transition phase is being completed.

In another embodiment, in case the transition phase is long the home BS 7, or the macro BS 5 via the home BS 7, may also provide a UE 9 with information about alternative BSs, which can serve such UE 9 during the transition phase. Furthermore, the UE 9 may also use this opportunity, i.e. the existents of a transition period, to go to sleep mode in order to save battery life. Alternatively the UE 9 may also use this transition phase to perform other tasks such as measurements on other cells etc.

According to another embodiment the transition phase (i.e. duration), which may be hard transition, smooth transition or partially smooth transition, may be pre-defined or signaled to the UE 9 via dedicated shared and broadcasted channels to inform UE 9 in idle and connected modes. Indication of a transition phase may also be combined with lower layer (e.g. physical layer or MAC signaling) and higher layer signaling (e.g. RRC). The lower layer signaling may indicate to the UE 9 when the transition starts. The higher layer signaling may provide the UE 9 with more comprehensive information about the transition phase e.g. actual duration or predefined time period for simultaneous transmission etc. Note that the predefined time period is preferably set as long as the transition phase so that no interruption occurs. It is however by no way restricted to that the predefined time period set for simultaneous transmission in dual frequency bands is set to be equal to the transition phase. The home BS 7 may us simultaneous transmission in combination with any other above mentioned embodiment.

Figure 9:
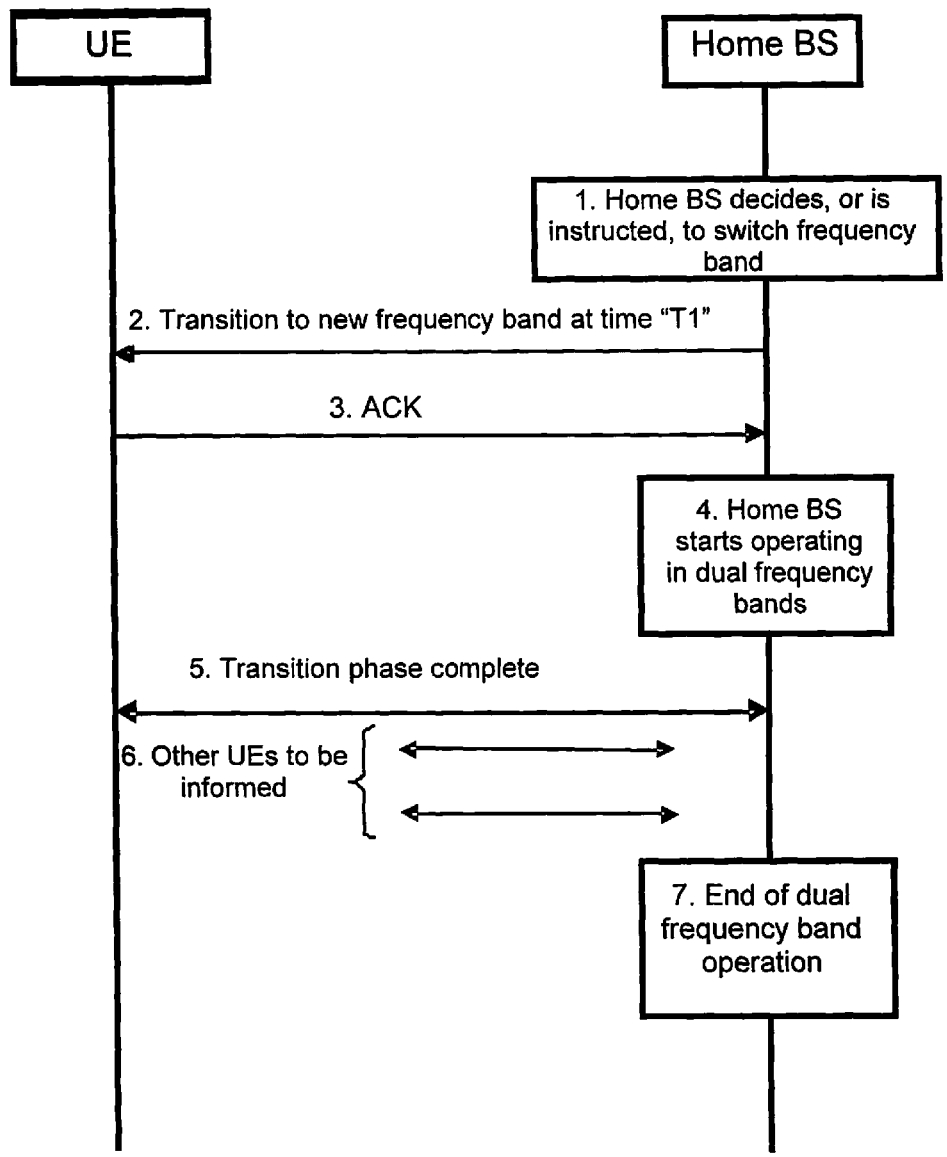
FIG. 9 is a schematic signaling sequence diagram illustrating home BS 7 initiated band selection with simultaneous dual frequency band operation.

FIG. 9 is a schematic signaling sequence diagram illustrating home BS 7 initiated band reselection/switching with simultaneous dual frequency band operation. According to this embodiment figure the home BS 7 decides, or is instructed by the macro BS 5, to switch frequency band. The home BS 7 then informs, e.g. by broadcast message, a UE 9 in a served cell 8 of the home BS 7 of a transition to new selected frequency band at predefined time period "T1", e.g. using a System Frame Number (SFN). The UE 9 then responses to the home BS 7 with an acknowledgment (ACK) of information. The home BS 7 upon receiving the ACK from the UE 9 starts operating in both the previously selected and the new selected frequency band for a predefined time period "T1" i.e. during the transition phase. When "T1" has passed the home BS 7 may inform the UE 9 that transition phase is complete and that only operation on the new selected frequency band is possible. Note, that other UEs 9 may also be informed of the start, duration and/or end of transition phase and the predefined timed period for dual operation, and that the home BS 7 may inform one or more CSGs separately based on UE preferences. Finally the home BS 7 ends operation in dual frequency bands and continues operating in the new selected frequency band.

According to another embodiment there is provided a method for redirection of UEs to an appropriate frequency band already at initial access to home BS 7, regardless of home BS 7 selection method. If there are multiple operational frequency bands of a home BS 7, it may be time consuming for UEs 9 to find a currently active operating frequency band. Therefore, according to one aspect of this embodiment the home BS 7 always listens to a Physical Random Access CHannel (PRACH) in a licensed frequency band that serves as a default frequency band for all UEs 9. For some UEs 9, this may also be the only frequency band in which they are capable of operating. Hence the transition to an unlicensed frequency band will not preclude such UEs 9.

Figure 10:
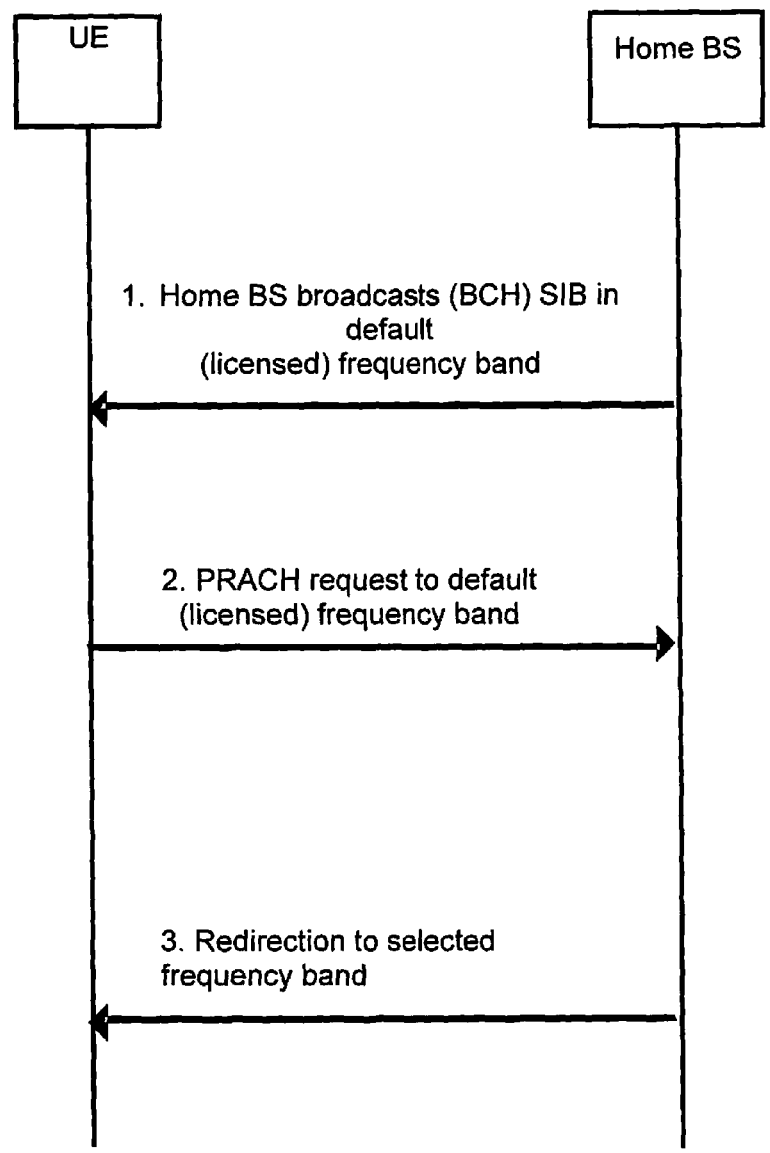
FIG. 10 is a schematic signaling sequence diagram illustrating a home BS 7 according to another embodiment of frequency band selection.

According to a second aspect, the home BS 7 may also broadcast system information, e.g. in a System Information Block (SIB), on a default licensed frequency band so as to allow all UEs 9 to decode such broadcasted system information. The SIB may comprise one or more of the following: information on a current operating frequency band used by the home BS 7; whether the home BS 7 accepts Random Access CHannel (RACH) messages on the default licensed frequency band; and the recommended frequency band that the UE 9 should attempt to access. The UE 9 may still attempt to get access on the default licensed frequency band by sending a PRACH request. This is described in FIG. 10. The home BS 7 may, irrespectively on the currently operating frequency band listen to PRACH messages on the default frequency band and send redirection information message as part of the Random Access (RA) response. As shown in FIG. 4, the redirection message will allow UE to start operation on a selected frequency band (e.g. unlicensed band), which is different than the default band. The default frequency band may also have limited operation such as for receiving RACH requests and for transmitting broadcast information and messages related to resource assignment/re-direction to another frequency band. In addition limited resources might be available for additional purpose e.g. for sending critical information, warning messages, emergency calls etc.

According to another embodiment the UE 9 may also interact in relation to any of the above mentioned methods, aspects and/or embodiments. The UE 9 may interact by preserving a connection, i.e. staying connected, while selection of a new frequency band is performed. The UE 9 may also perform power saving during a transition phase, i.e. when a home BS 7 selects a new frequency band other than the one in currently operating, by going to sleep temporarily. Additionally the UEs 9 supporting only licensed frequency band may still send request, i.e. PRACH requests, for connection to that licensed frequency band.

Optionally, the user equipment arrangement 700 further also may comprise a processing unit 770. The processing unit 770 may be represented by e.g. a Central Processing Unit (CPU), a processor, a microprocessor, or other processing logic that may interpret and execute instructions. The processing unit 770 may perform all data processing functions for inputting, outputting, and processing of data including data buffering and device control functions, such as call processing control, user interface control, or the like. Additionally, one or more of the mentioned circuits (110, 120, 140, 150) may be parts of one and a same processor circuit 130, i.e. co-located within one unit/circuit.

It is to be noted that the term home BS refers of any type of BS, which is capable of serving a localized radio environment e.g. assembly hall, office, home, indoor shopping mall, etc.

For example a pico base station or a relay node serving a local area may also be regarded as home BS. Similarly the macro BS refers to any type of BS, which is capable of serving an open area radio environment e.g. outdoor areas, city centres etc. For example a micro base station or an outdoor relay node serving an open area may also be regarded as macro BS according to the embodiments mentioned above.

It is to be noted that any internal electronics of the home BS (7, 700) or macro BS 5, not completely necessary for understanding the present methods and their embodiments as well as the aspects of embodiments, has been omitted from FIG. 7 and FIG. 8, for clarity reasons.

Further, it is to be noted that some of the described circuits 110-150 and 710-730 comprised within the network node 100 and home BS (7, 700) are to be regarded as separate logical entities but not with necessity separate physical entities. To mention just one example, the transceiver circuit 110, the second transceiver 720 and the third transceiver 730 may be comprised or co-arranged within the same physical circuit 110.

The method steps S10-S60 in the network node may further be implemented through one or more processor circuits 110-150, and 710-730 in a home BS 7 or in a macro BS 5, together with computer program code for performing the functions of the present method. Thus a computer program product, comprising instructions for performing the method in a network node may assist, when the computer program product is loaded into or run in the network node 100.

The computer program product mentioned above may be provided for instance in the form of a data carrier carrying computer program code for performing the method in a network node 100 when being loaded or run on the network node 100. The data carrier may be e.g. a hard disk, a CD ROM disc, a memory stick, an optical storage device, a magnetic storage device or any other appropriate medium such as a disk or tape that can hold machine readable data. The computer program code can furthermore be provided as program code on a server and downloadable to the network node 100 remotely, e.g. over an Internet or an intranet connection.

When using the formulation "comprise" or "comprising" it is to be interpreted as non-limiting, i.e. meaning "consist at least of". The present invention is not limited to the above described preferred embodiments. Various alternatives, modifications and equivalents may be used. Therefore, the above embodiments are not to be taken as limiting the scope of the present invention, which is defined by the appending claims.

The invention claimed is:

1. A method in a network node for selecting a frequency band to be used for communicating with user equipments in a wireless communication network, the network node being a macro base station or a home base station in the wireless communication network and the frequency band being either a licensed frequency band or an unlicensed frequency band, said method comprising:
 obtaining radio condition measurements performed on at least one of the licensed frequency band and the unlicensed frequency band;
 selecting the frequency band, based on the obtained radio condition measurements; and
 updating the home base station with the selected frequency band to be used for communication with one or more of the user equipments, wherein updating the home base station with the selected frequency band comprises updating the network node with an access control mechanism determined by the macro base station.

2. The method according to claim 1, wherein obtaining the radio condition measurements comprises obtaining user equipment measurements performed by the user equipments, and wherein selecting the frequency band comprises selecting the frequency band based on the obtained radio condition measurements and on the obtained user equipment measurements.

3. The method according to claim 1, wherein obtaining the radio condition measurements comprises obtaining user equipment preferences, the user equipment preferences comprising one or more of the following: closed subscriber group memberships; session prioritizations; and indications of preferred frequency bands;
 and, wherein selecting the frequency band comprises selecting the frequency band based on the obtained radio condition measurements and on the obtained user equipment preferences.

4. The method according to claim 1, wherein selecting the frequency band includes comparing the obtained radio condition measurements with one or more threshold values that are predefined or obtained via a backhaul link, a radio connection, or from a core network node.

5. The method according to claim 1, wherein selecting the frequency band includes determining available unlicensed frequency bands among the unlicensed frequency bands, and verifying that the home base station is capable of operating in the determined available unlicensed frequency bands.

6. The method according to claim 5, wherein obtaining the radio condition measurements comprises obtaining radio condition measurements, user equipment measurements, and/or user preferences via a backhaul link to the home bases station, via a radio connection to the home base station, or from a core network node.

7. The method according to claim 6, wherein the macro base station is the network node, and wherein updating the home base station with the selected frequency band comprises the macro base station updating the home base station with the selected frequency band by sending an update message to the home base station, wherein the update message indicates the selected frequency band.

8. The method according to claim 7, wherein updating the home base station with the selected frequency band comprises the macro base station sending the update message to the home base station according to any one of the following operations: broadcasting the update message over a radio interface and requiring the home base station to listen; sending the update message to the home base station via a backhaul network; or sending the update message to the home bases station via a user equipment.

9. The method according to claim 5, wherein updating the home base station with the selected frequency band comprises the macro base station sending an update message to the home base station, the update message indicating the selected frequency band and one or more of the following information: interference level of one or more licensed frequency bands; interference level of one or more of unlicensed frequency bands; indications of other recommended frequency bands other than the selected frequency band; and indicators of priority level for each of the recommended frequency bands.

10. A method in a home base station for selecting a frequency band to be used for communicating with user equipments in a wireless communication network, the frequency band being either a licensed frequency band or an unlicensed frequency band, said method comprising:

obtaining radio condition measurements performed on at least one of the licensed frequency band and the unlicensed frequency band;

selecting the frequency band, based on the obtained radio condition measurements; and updating the home base station with the selected frequency band to be used for communication with one or more of the user equipments, wherein the network node is the home base station, and wherein the home base station is configured to perform the steps of obtaining, selecting and updating.

11. A method in a network node for selecting a frequency band to be used for communicating with user equipments in a wireless communication network, the network node being a macro base station or a home base station in the wireless communication network and the frequency band being either a licensed frequency band or an unlicensed frequency band, said method comprising:

obtaining radio condition measurements performed on at least one of the licensed frequency band and the unlicensed frequency band;

selecting the frequency band, based on the obtained radio condition measurements;

updating the home base station with the selected frequency band to be used for communication with one or more of the user equipments;

determining if the selected frequency band as indicated by the updating is a newly selected frequency band that is different from a previously selected frequency band;

transmitting at least one of data and information on the newly selected frequency band and on the previously selected frequency band simultaneously for a predefined time period; and switching to the newly selected frequency band after the predefined time period has passed.

12. A network node configured to select a frequency band to be used for communicating with one or more user equipments in a wireless communication network that includes a macro base station and a home base station, wherein the frequency band is selected as one of a licensed frequency band or an unlicensed frequency band, and wherein the network node comprises:

a transceiver circuit adapted to obtain radio condition measurements performed on at least one of the licensed frequency band and the unlicensed frequency band;

a selector circuit adapted to select the frequency band based on the obtained radio condition measurements; and a processor circuit adapted to update the home base station with the selected frequency band to be used for communication with one or more of the user equipments, wherein the processor circuit is adapted to update the network node with an access control mechanism determined by the macro base station.

13. The network node according to claim 12, wherein the transceiver circuit is adapted to obtain user equipment measurements performed by the user equipments, and wherein the selector circuit is adapted to select the frequency band based on the obtained radio condition measurements and on the obtained user equipment measurements.

14. The network node according to claim 12, wherein the transceiver circuit is adapted to obtain user equipment preferences, the user equipment preferences comprising one or more of the following: closed subscriber group memberships; session prioritizations; and indications of preferred frequency bands; and wherein the selector circuit is adapted to select the frequency band based on the obtained radio condition measurements and on the obtained user equipment preferences.

15. The network node according to claim 12, further comprising a comparison circuit adapted to perform a comparison of the obtained radio condition measurements with one or more threshold values that are predefined or obtained via a backhaul connection, and wherein the selector circuit is adapted to select the frequency band based at least in part on the comparison.

16. The network node according to claim 12, wherein, in being adapted to select the frequency band, the selector circuit is further adapted to determine available unlicensed frequency bands among the unlicensed frequency bands, and to verify that the home node base station is capable of operating in the determined available unlicensed frequency bands.

17. The network node according to claim 12, wherein the network node is the macro base station.

18. The network node according to claim 17, wherein the transceiver circuit is adapted to obtain the radio condition measurements, user specific measurements, and/or user preferences from at least one of a backhaul network and the home base station or any one or more other home base stations.

19. The network node according to claim 18, wherein the update message includes one or more of the following information: interference level of one or more licensed bands, interference level of one or more of unlicensed bands, indications of other recommended frequency bands other than the selected frequency band, and, indicators of priority level for each of the recommended frequency bands.

20. The network node according to claim 17, wherein, in being adapted to update the home base station with the selected frequency band, the processor circuit is further adapted to update the home base station with the selected frequency band by sending an update message to the home base station.

21. The network node according to claim 20, wherein the processor circuit is adapted to update the home base station of the selected frequency band by sending an update message to the home base station according to any one of the following principles: broadcasting the update message over a radio interface and requiring the home base station to listen, sending the update message to the home base station via a backhaul network, and sending the update message to the home bases station via a user equipment.

22. A network node configured to select a frequency band to be used for communicating with one or more user equipments in a wireless communication network that includes a macro base station and a home base station, wherein the frequency band is selected as one of a licensed frequency band or an unlicensed frequency band, and wherein the network node comprises:

a transceiver circuit adapted to obtain radio condition measurements performed on at least one of the licensed frequency band and the unlicensed frequency band;

a selector circuit adapted to select the frequency band based on the obtained radio condition measurements; and a processor circuit adapted to update the home base station with the selected frequency band to be used for communication with one or more of the user equipments, wherein the network node is the home base station.

23. A network node configured to select a frequency band to be used for communicating with one or more user equipments in a wireless communication network that includes a macro base station and a home base station, wherein the frequency band is selected as one of a licensed frequency band or an unlicensed frequency band, and wherein the network node comprises:
- a transceiver circuit adapted to obtain radio condition measurements performed on at least one of the licensed frequency band and the unlicensed frequency band;
- a selector circuit adapted to select the frequency band based on the obtained radio condition measurements;
- a processor circuit adapted to update the home base station with the selected frequency band to be used for communication with one or more of the user equipments;
- a determining circuit adapted to determine if the selected frequency band is a newly selected frequency band that is different from a previously selected frequency band;
- a second transceiver adapted to transmit at least one of data and information on the newly selected frequency band;
- a third transceiver adapted to transmit the data and/or information on the previously selected frequency band simultaneously for a predefined time period; and
- a switch circuit adapted to switch to the newly selected frequency band after the predefined time period has passed.

\* \* \* \* \*

UNITED STATES PATENT AND TRADEMARK OFFICE
CERTIFICATE OF CORRECTION

| | | |
|---|---|---|
| PATENT NO. | : 9,066,250 B2 | Page 1 of 1 |
| APPLICATION NO. | : 13/817909 | |
| DATED | : June 23, 2015 | |
| INVENTOR(S) | : Kazmi et al. | |

It is certified that error appears in the above-identified patent and that said Letters Patent is hereby corrected as shown below:

In the Specification

In Column 4, Line 30, delete "and an processor" and insert -- and a processor --, therefor.

In Column 4, Line 66, delete "schematic" and insert -- is a schematic --, therefor.

In Column 8, Line 20, delete "home BS 5" and insert -- home BS 7 --, therefor.

In Column 10, Line 13, delete "home BS 5" and insert -- home BS 7 --, therefor.

In Column 12, Line 47, delete "macro cell 9" and insert -- macro cell 6 --, therefor.

In Column 15, Line 1, delete "UEs 7" and insert -- UEs 9 --, therefor.

In the Claims

In Column 18, Line 32, in Claim 6, delete "home bases" and insert -- home base --, therefor.

In Column 18, Lines 50-51, in Claim 8, delete "home bases" and insert -- home base --, therefor.

In Column 20, Lines 45-46, in Claim 21, delete "home bases" and insert -- home base --, therefor.

Signed and Sealed this
Twenty-sixth Day of April, 2016

Michelle K. Lee
*Director of the United States Patent and Trademark Office*